Figures 1, 5:
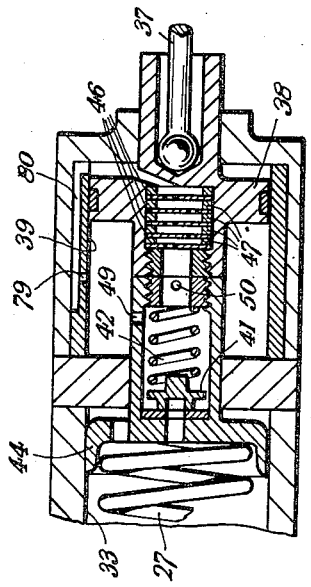

Aug. 7, 1951　　　　E. DODSON ET AL　　　　2,563,219
FLUID CONTROL VALVE
Filed July 23, 1946　　　　　　　　　　　　3 Sheets-Sheet 1

Inventors
Edward Dodson
Ray Westburr
By Moses, Nolte, Crews & Berry
Attys.

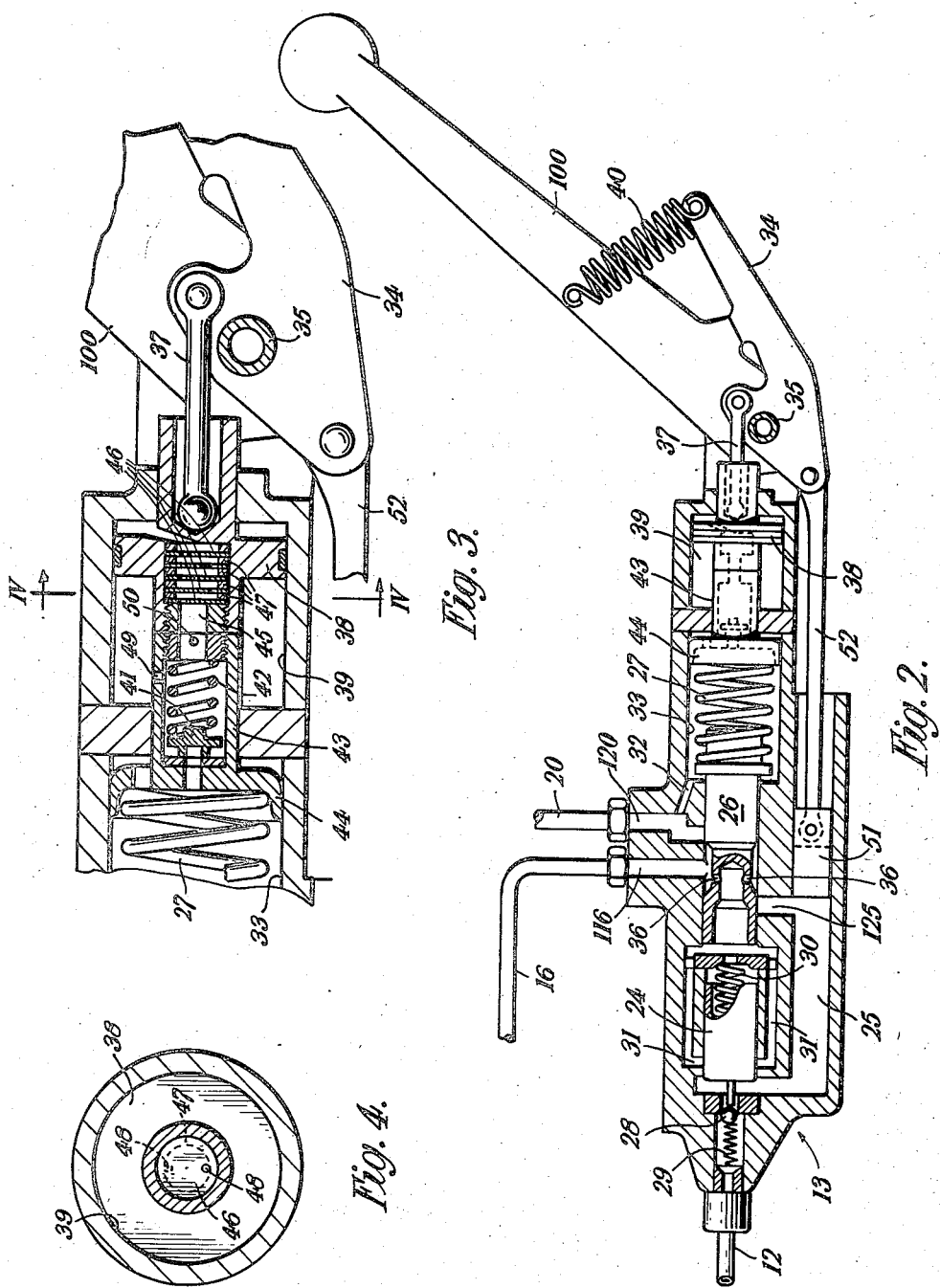

Aug. 7, 1951   E. DODSON ET AL   2,563,219
FLUID CONTROL VALVE

Filed July 23, 1946   3 Sheets-Sheet 3

Patented Aug. 7, 1951

2,563,219

UNITED STATES PATENT OFFICE 2,563,219

FLUID CONTROL VALVE

Edward Dodson, Puriton, near Bridgewater, and Roy Westbury, Lapley, England, assignors to H. M. Hobson Limited, London, England, a company of Great Britain Application July 23, 1946, Serial No. 685,594
In Great Britain August 13, 1945

5 Claims. (Cl. 303—54)

1

This invention relates to fluid-pressure-operated remote control systems of the kind, described for example in British patent specification No. 483,049, comprising a source of hydraulic pressure, a sender unit at one station, a receiver unit at a distant station, a pipe line connecting the two units, an operating member for the sender unit which is operable to establish in the pipe line a hydraulic pressure (hereinafter termed the signal line pressure) derived from the source and varying with and determined by the setting of said operating member, and an apparatus at the distant station coupled to the receiver unit and arranged to be moved thereby into a position determined by the signal line pressure.

One important application of remote control systems of the above kind is for the operation of aircraft flaps. These are generally operated each by a separate hydraulic jack controlled by a receiver unit, all of which receiver units are controlled by the setting of a single sender unit. It is most important to ensure that the multiple jacks will synchronise both as regards rate of movement and as regards position, despite variations in load on the jacks due to different aerodynamic loads acting on their associated flaps; since very dangerous conditions can arise when an aircraft is taking off if the flaps are not properly synchronised. It is also important that, under some flying conditions at least, it should not be possible for the flaps to be moved too suddenly from the raised to the lower position; as this may lead to overstressing of parts of the aircraft structure.

The invention provides a sender unit for a remote control system of the above kind, which includes a delay device for introducing a predetermined time lag between the manipulation of the operating member and the establishment of the resultant change in signal line pressure.

In the case of a sender unit of the kind described in United States patent specification No. 2,344,768 or in United States patent specification No. 2,379,692, in which the signal line pressure is controlled by a piston valve exposed at one end to signal line pressure and at the other to the balancing pressure of a spring, the compression of which is variable by the operating member, the delay device may conveniently be constituted by a dashpot piston interposed between the operating member and the balancing spring and arranged to apply slowly to the balancing spring the changes of load corresponding to movement of the operating member.

2

The result of this time lag is that a sudden movement cannot be applied to the flap-operating jacks and that any jack which is more lightly loaded than the others cannot race the more heavily loaded ones as the jacks move towards the positions determined by the change in position of the operating member.

Figure 6:
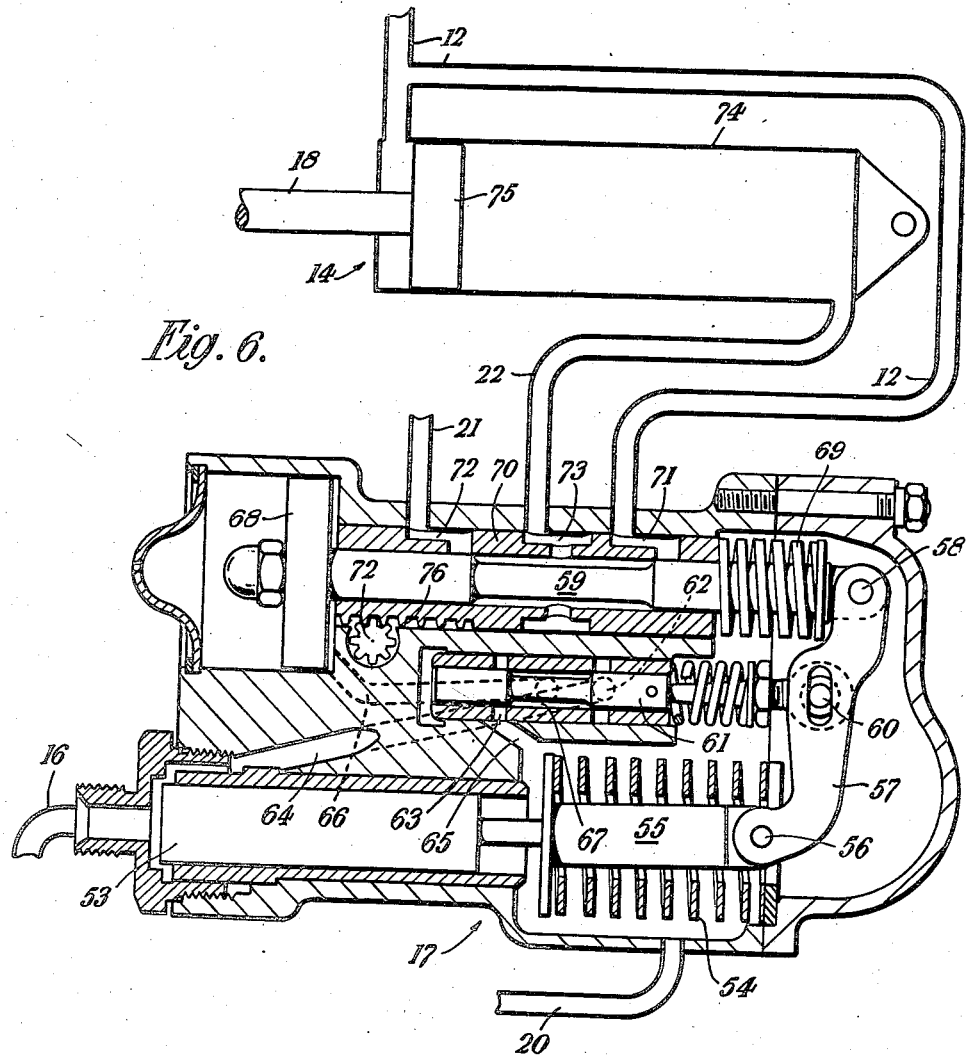
Figure 7:
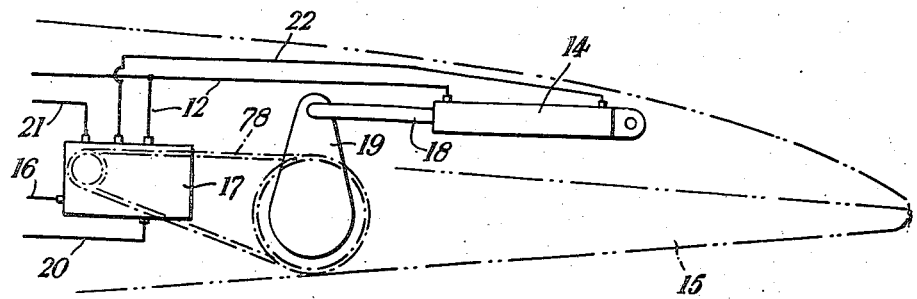

One embodiment of the invention, as applied to a flap-operating remote control system, will now be described in further detail by way of example with reference to the accompanying drawings, in which, Fig. 1 is a diagram showing the pipe layout of the system, Fig. 2 is a vertical section through the sender unit, Fig. 3 is an enlarged vertical section through the dashpot device in the sender unit, Fig. 4 is a section on the line IV—IV in Fig. 3, Fig. 5 is a view, similar to Fig. 3, showing a modified form of dashpot device, Fig. 6 is a section through one of the receiver units, showing diagrammatically its connections to the associated jack, and Fig. 7 is a view showing the follow-up linkage between one of the jacks and its associated receiver unit.

Like references indicate like parts throughout the figures.

The general layout of the system is shown in Fig. 1. A pump 10 feeds oil from a tank 11 along a pressure line 12 leading to a sender unit 13 in the cockpit, and to four jacks 14, one associated with each of four flaps 15. The sender unit 13 is operable to vary the hydraulic pressure established in a signal line 16 leading from the sender unit to four receiver units 17, one associated with each of the four jacks 14. The pressure line 12 has a branch leading to each receiver unit. Each receiver unit controls, according to the pressure in the signal line 16, the position of the piston of the associated jack 14. The piston rod 18 (Fig. 7) is coupled to an arm 19 secured to the flap 15 and serving to effect pivotal movement of the flap as the jack piston moves in its cylinder. An exhaust line 20 leads from the sender unit 13 and from one end of each receiver unit 17 to the tank 11, and a second exhaust line 21 leads from the other end of each receiver unit 17 to the tank. A pipe 22 connects each receiver unit 17 with its jack 14. A relief valve 23 is connected between the lines 12, 20. The signal line pressure may conveniently vary between a minimum value of 65 lbs./sq. in. corresponding to the up position of the flaps, and a maximum value of 200 lbs./sq. in. corresponding to the fully down position of the flaps. The signal line pressure controls the setting of the four receiver units 17 which, in turn, control the flow of liquid at high pressure to the jacks, a follow-up mechanism being interposed between each jack and its receiver unit as later described.

The sender unit 13 (Figs. 2–4) is of the type described in United States patent specification No. 2,379,692 and embodies a reducing valve 24 for establishing within a conduit 25 in the sender unit a reduced pressure, derived from a high pressure line 12, which may be as high as 3000 lbs./sq. in., said reduced pressure being always in excess of the signal line pressure by a fixed amount, e. g. 50 lbs./sq. in. The signal line pressure is adjusted by a piston valve 26 which, when moved from its neutral position, connects the signal line 16 either to the above-mentioned conduit 25 or to the exhaust line 20. The piston valve 26, when so moved, connects an outlet 116 leading to the signal line either to an exhaust port 120 communicating with the exhaust line 20, or to an inlet port 125 leading to conduit 25. The piston valve is exposed at the left hand end to signal line pressure, acting on its hollow interior through apertures 36, and at the right hand end to the pressure of a balancing spring 27, the compression of which is variable by a pilot's operating lever 100.

The operation of the sender unit is fully explained in United States patent specification No. 2,379,692, and need therefore only be described briefly. A ball valve 28, loaded by a spring 29, controls the admission of high pressure fluid from line 12 to conduit 25. The reducing valve 24 is loaded by a spring 30. When the pressure in conduit 25, acting on the left hand end of valve 24, balances the pressure of spring 30, and the signal pressure, which act on the right hand end of the valve, the valve 24 occupies the position shown and the ball valve 28 is closed. When the valve 26 moves to the left to increase the signal line pressure, valve 24 moves to the left to open ball valve 28 and allow pressure fluid to enter the conduit 25 from the pressure line 12. When the valve 26 moves to the right to reduce the signal line pressure, valve 24 moves to the right to allow liquid to flow from conduit 25 to the exhaust line 20 through passages 31. A passage 32 allows the cavity 33 housing spring 27 to fill with fluid at the pressure of exhaust line 20.

The pilot's lever 100 does not, as in the case of United States patent specification No. 2,379,692, operate directly on the balancing spring 27, but is coupled by an operating spring 40 to a lever 34, pivoted at 35, which lever is connected by a ball-ended link 37 to a dash-pot piston 38 (see Fig. 3). This dash-dot piston 38 moves in a cylinder 39 which is filled with liquid from housing 33 by means of a filling valve 41 loaded by a spring 42. A forwardly extending sleeve 43 on the dash-pot piston carries an abutment cup 44 for the right hand end of the balancing spring 27, which abutment cup 44 is a sliding fit in the housing 33 containing the balancing spring; and the filling valve 41 permits liquid to flow into the interior of sleeve 43. A passage 45 leads from the rear or right hand end of the sleeve 43 through the dashpot piston 38 and to the rear of its cylinder 39, and in the rear portion of the sleeve are located a number of discs 46, spaced apart by packing rings 47, and formed each with a small aperture 48. The apertures 48 are relatively staggered so as to provide a labyrinthine passage for the liquid which is displaced by the movement of the dash-pot piston from one side to the other of said piston, so imposing the desired time delay. Holes 49, 50 provide access for liquid from the front of the dash-pot piston 38 to the passage 45. An advantage of using multiple discs such as 46 to form the fluid escapement is that comparatively large orifices 48 can be used in the discs, while still preserving an adequate dash-pot action, so that stoppage of the liquid passage by dirt in the liquid is prevented. With this form of sender unit a pilot can immediately move his operating lever 100 to the position on a graduated quadrant (not shown) indicating the desired flap angle and the signal line pressure will respond, but will not reach the selected value until after the time interval imposed by the dash-pot, the change in signal line pressure taking place at a rate controlled by the dash-pot. When the pilot's lever 100 is moved anti-clockwise from the position shown to lower the flaps, the operating spring 40 is immediately put under tension and the tension of this spring then acts through the connected lever 34 on the dash-pot piston 38 to cause the latter to apply the desired additional compression to the balancing spring 27 and so move the piston valve 26 of the sender unit to the left, i. e. into position to increase the signal line pressure. When the pilot's lever 100 is moved in the direction to raise the flaps the tension of the operating spring 40 is reduced and the compression of the balancing spring 27 then operates to move the dash-pot piston 38 rearwardly. The balancing spring 27 can be made stronger than the operating spring 40 so that the dash-pot piston will tend to move more rapidly in the direction to decrease the signal line pressure, with the result that the rate of movement will be faster when the flaps are to be moved up than when they are to be moved down. The reverse arrangement can be adopted however, in case it is desired that the dash-pot piston should move more rapidly in the direction to increase the signal line pressure.

A piston 51, connected by a link 52 to the lever 34, operates as described in United States patent specification No. 2,397,692, to balance the torque imposed on the lever 34 by the spring 27, piston 51 being exposed to the pressure in the conduit 25.

Each receiver unit 17, see Fig. 6, comprises a piston 53 exposed at the left hand end to the signal line pressure and at the other end to exhaust pressure, applied by line 20, and to the balancing pressure of a spring 54. The piston rod 55 is pivotally connected at 56 to one end of a lever 57 which is pivoted at its other end 58 to the servo valve 59 of the associated jack 14 and is pivoted intermediately at 60 to a piston type relay valve 61. The relay valve controls ports 62, 63 communicating respectively, via passages 64, 65, with signal line pressure and with exhaust, and has a central annulus 67 communicating, via passage 66, with the right hand end of a piston 68 attached to the servo valve 59 of the jack. When the relay valve is displaced from its neutral position the annulus 67 is connected either to signal line pressure or to exhaust, with the result that the piston 68 and servo valve 59 are caused to move to the left against the action of a strong spring 69, in the case where signal line pressure is connected to the annulus, or to the right under the action of that spring 69, when the annulus is connected to exhaust.

The servo valve 59 slides in a guide 70 provided with three ports, 71, 72, 73 communicating respectively with the high pressure line 12, the exhaust line 21, and the line 22 leading to the right hand end of the jack cylinder 74. The other end of the jack cylinder is connected to the high pressure line 12, which acts on the side of the jack piston 75 to which the piston rod 18 is connected. According to the direction of displacement, under the control of the relay valve 61, of the servo valve 59 from its neutral position, the jack piston 75 is caused to execute a corresponding movement to operate the flap. A follow-up gear, shown in Fig. 7, is provided between the flap operating lever 19, and the servo valve guide 70, this being constituted by rack teeth 76 on the guide 70 engaging a pinion 77 operated by the movement of the lever through a chain and sprocket drive 78.

In practice, the port openings in the receiver unit are very small and the valves hover about their neutral positions moving a few thousandths of an inch only on either side and automatically adjusting the port areas to keep the flap moving at the speed determined by the dash-pot piston 38 fitted to the sender unit.

Each jack is capable of moving through its entire range of movement at a speed far in excess of that desired. As explained above, the dash-pot in the sender unit controls the rate of response of the jacks to movement of the operating lever 100 by delaying the establishment in the signal line of the corresponding change in signal pressure. The movement imparted to valve 59 (Fig. 6) of the receiver unit in response to a change in signal pressure is small, so that the port 71 or 72 in sleeve 70 is opened to a small extent only, and the open port closes as sleeve 70 receives movement from the follow-up gear on responsive movement of the jack and the flap operated thereby. If the jack tends to lag, the sleeve 70 lags also, and the resulting greater area of port opening causes the jack to speed up. Similarly if the jack tends to travel too fast, the port opening is quickly reduced, and the jack consequently slowed down. The dash-pot control at the sender unit in combination with the above described form of follow-up gear in the receiver unit ensure synchronisation in operation of the flaps within fine limits.

The above-described flap control system gives an infinitely variable control of the flap without the necessity for mechanical linkages between the flap and the cockpit. As explained above, the pilot can choose any required flap angle merely by selecting the corresponding setting of the lever on the quadrant in the cockpit. The flaps are synchronised hydraulically and no mechanical flap interlinkage is required, and synchronism is not affected by differential loadings on the flaps unless the loads exceed the maximum thrust available from the jacks at the normal pumping pressure. The difference in length of the pipes between the cockpit and the several jacks will not affect synchronism.

It has already been explained that the time lag may be made less for flap raising operations than for flap lowering operations. It can, if necessary, also be adjusted so that movement is faster when the flaps are close to the up position than when they are in other positions. This can be effected, as shown in Fig. 5, by providing a port 79 in the wall of the dash-pot cylinder which communicates, via a bye-pass passage 80 with the rear end of the cylinder, and is masked by the piston 38 when the latter reaches a certain position in its forward travel. The piston will slow down after the port 79 has been masked, and will thus move more rapidly when near the rear end of its cylinder, i. e. when the flaps are nearly up.

The cockpit control is finger light in operation and the flaps are maintained at their correct settings with a maximum error of 1% of total flap angle, irrespective of temperature changes, slight leakage from pipes, or seepage past glands and pistons.

What we claim as our invention and desire to secure by Letters Patent is:

1. In a sender unit for establishing a variable hydraulic signal pressure in a pipe line, comprising an operating member, a cylinder having inlet and exhaust ports, an outlet for connection to the pipe line, a piston valve in the cylinder exposed at one end to the pressure at the outlet, a balancing spring for applying a balancing pressure to the other end of said piston valve, said piston being operable by movement in opposite directions from a neutral position to place the outlet in connection with the inlet port or with the exhaust port respectively, the combination with the balancing spring and operating member of a dash-pot cylinder, a dash-pot piston movable therein and operable to vary the loading of the balancing spring, and a linkage connecting the dash-pot piston and the operating member.

2. Apparatus as claimed in claim 1, in which the dash-pot piston has a hollow extension abutting the balancing spring, the interior of said extension communicating with the dash-pot cylinder on opposite sides of the dash-pot piston, and comprising within said hollow extension a plurality of apertured discs having therein relatively staggered apertures affording a labyrinthine passage through said extension for fluid displaced by the dash-pot piston on movement thereof in its cylinder.

3. Apparatus as claimed in claim 1, comprising a port in the wall of the dash-pot cylinder, and a by-pass passage connecting said port with the end of said cylinder, said port being inoperative over a certain range of travel of the piston in the cylinder, but being effective to allow liquid to pass from one side of the piston to the other through the by-pass passage, and therefore permit of faster movement of the piston, during the remainder of its travel.

4. A sender unit for establishing a variable hydraulic signal pressure in a pipe line, comprising an operating member, a cylinder having inlet and exhaust ports, an outlet for connection to the pipe line, a piston valve in the cylinder exposed at one end to the pressure at the outlet and at the other to the pressure of a balancing spring and operable, by movement in opposite directions from a neutral position, to place the outlet in communication with the inlet port or with the exhaust port respectively, a connection between the operating member and the balancing spring for varying the loading of the balancing spring in accordance with changes in the position of the member, said connection including a dash-pot piston for slowing down the application of changes of load to the balancing spring, and a fluid escapement between opposite ends of a cylinder housing the dash-pot piston, the fluid escapement comprising a plurality of discs, each having an aperture and the apertures in successive discs being relatively staggered, said discs providing a labyrinthine passage for the liquid displaced from one side to the other of the dashpot piston on movement of said piston.

5. A sender unit for establishing a variable hydraulic signal pressure in a pipe line, a cylinder having inlet and exhaust ports, an outlet for connection to the pipe line, a piston valve in the cylinder exposed at one end to the pressure at the outlet and at the other to the pressure of a balancing spring and operable, by movement in opposite directions from a neutral position, to place the outlet in communication with the inlet port or with the exhaust port respectively, an operating lever mounted for pivotal movement in relation to the cylinder, a second lever pivoted to the cylinder and spring coupled to the operating lever, a dash-pot piston having an extension constituting an abutment for said balancing spring, and a link connecting said second lever to said dash-pot piston and operable to move the same to vary the loading of said balancing spring in accordance with changes in position of said second lever.

EDWARD DODSON.
ROY WESTBURY.

REFERENCES CITED

The following references are of record in the file of this patent:

UNITED STATES PATENTS

| Number | Name | Date |
| --- | --- | --- |
| 998,997 | Taraglio | July 25, 1911 |
| 2,035,954 | Focht | Mar. 31, 1936 |
| 2,090,246 | Alexander | Aug. 17, 1937 |
| 2,344,768 | Dodson | Mar. 21, 1944 |
| 2,379,692 | Dodson | July 3, 1945 |
| 2,399,474 | Dodson | Apr. 30, 1946 |
| 2,399,719 | Bergh | May 7, 1946 |
| 2,404,512 | May et al. | July 23, 1946 |
| 2,505,578 | Rockwell | Apr. 25, 1950 |

FOREIGN PATENTS

| Number | Country | Date |
| --- | --- | --- |
| 234,124 | Great Britain | of 1926 |